(12) United States Patent
Harada et al.

(10) Patent No.: US 11,007,590 B2
(45) Date of Patent: May 18, 2021

(54) THREAD FORMING TAP AND MANUFACTURING METHOD FOR THREAD FORMING TAP

(71) Applicant: OSG CORPORATION, Toyokawa (JP)

(72) Inventors: Kazumitsu Harada, Toyokawa (JP); Yousuke Suzuki, Toyokawa (JP)

(73) Assignee: OSG CORPORATION, Toyokawa (JP)

( * ) Notice: Subject to any disclaimer, the term of this patent is extended or adjusted under 35 U.S.C. 154(b) by 204 days.

(21) Appl. No.: 16/316,417

(22) PCT Filed: Aug. 9, 2016

(86) PCT No.: PCT/JP2016/073424
§ 371 (c)(1),
(2) Date: Jan. 9, 2019

(87) PCT Pub. No.: WO2018/029780
PCT Pub. Date: Feb. 15, 2018

(65) Prior Publication Data
US 2019/0291196 A1    Sep. 26, 2019

(51) Int. Cl.
*B23G 7/02* (2006.01)
*B23G 5/06* (2006.01)
*B23P 15/52* (2006.01)

(52) U.S. Cl.
CPC .............. *B23G 5/06* (2013.01); *B23G 7/02* (2013.01); *B23P 15/52* (2013.01); *B23G 2200/34* (2013.01)

(58) Field of Classification Search
CPC ... B23G 5/06; B23G 7/00; B23G 7/02; B23G 9/004; B23G 2200/28; B23G 2200/30; B23G 2200/34; B23P 15/52
See application file for complete search history.

(56) References Cited

U.S. PATENT DOCUMENTS 2,816,302 A * 12/1957 Bauer .................. B23G 5/06
                                                        72/71
3,171,146 A    3/1965 Moss
(Continued)

FOREIGN PATENT DOCUMENTS

CN    1319469 A    10/2001
CN    1418749 A    5/2003
(Continued)

OTHER PUBLICATIONS

Notification of Transmittal of Translation of the International Preliminary Report on Patentabililty (Form PCT/IB/326) issued in counterpart International Application No. PCT/JP2016/073424 dated Feb. 21, 2019 with Forms PCT/IB/373, PCT/IB/338, and PCT/ISA/237, with English translation (15 pages).
(Continued)

*Primary Examiner* — Edward T Tolan
(74) *Attorney, Agent, or Firm* — Westerman, Hattori, Daniels & Adrian, LLP (57) ABSTRACT

A thread forming tap includes a partial thread. The partial thread is provided, in the axis direction view, with a protrusion formed so as to protrude in the radial direction and a clearance section formed so as to have a smaller diameter than the protrusion, and as a result of the foregoing, if a thread forming tap rotates in a state where the inner circumferential surface of a pilot hole and the partial thread come into contact, the protrusion of the partial thread can be caused to engage with the inner circumferential surface of the pilot hole. Due to this configuration, rubbing in a state where the partial thread is pressed against the inner circumferential surface of the pilot hole can be suppressed, and as a result, chipping of the partial thread can be prevented.

4 Claims, 3 Drawing Sheets

(56) References Cited

U.S. PATENT DOCUMENTS

| | | | |
|---|---|---|---|
| 3,775,792 A | 12/1973 | Leonard | |
| 5,795,120 A | 8/1998 | Hurdle | |
| 6,217,267 B1* | 4/2001 | Sugano | B23G 7/02 |
| | | | 408/222 |
| 7,468,001 B2* | 12/2008 | Akaki | B23G 5/06 |
| | | | 408/220 |
| 7,927,221 B2 | 4/2011 | Glimpel et al. | |
| 9,682,435 B2* | 6/2017 | Yan | B23G 7/02 |
| 2001/0034188 A1 | 10/2001 | Sawabe et al. | |
| 2003/0108396 A1 | 6/2003 | Schwarz | |
| 2010/0092257 A1 | 4/2010 | Henderer et al. | |

FOREIGN PATENT DOCUMENTS

| | | | |
|---|---|---|---|
| CN | 1827277 A | 9/2006 | |
| JP | 46-22426 Y | 8/1971 | |
| JP | 2-3325 U | 1/1990 | |
| JP | 2001-252827 A | 9/2001 | |
| JP | 2004-114223 A | 4/2004 | |
| JP | 2004-314231 A | 11/2004 | |
| JP | 2006-239858 A | 9/2006 | |
| JP | 2011-152614 A | 8/2011 | |
| JP | 2012-35351 A | 2/2012 | |

OTHER PUBLICATIONS

International Search Report dated Sep. 13, 2016, issued in counterpart application No. PCT/JP2016/073424 (2 pages).
Written Opinion in Japanese dated Sep. 13, 2016, issued in counterpart application No. PCT/JP2016/073424 (4 pages).
Extended European Search Report dated Sep. 18, 2019, issued in counterpart EP Application No. 16912663.8. (7 pages).

* cited by examiner

Fig. 2

THREAD FORMING TAP AND MANUFACTURING METHOD FOR THREAD FORMING TAP

TECHNICAL FIELD

This invention relates to thread forming taps, and particularly to a thread forming tap capable of reducing machining defects in internal threads, and a manufacturing method for the thread forming tap.

BACKGROUND ART

Thread forming taps have a thread formed at the front end of a chamfer portion which is known as an incomplete thread (partially-cut, not-fully-formed thread having no flank on the front end side of the chamfer portion) (e.g., Patent Literature 1). The incomplete thread is conventionally beveled along the circumference direction about the axis of the thread forming taps to remove their crests.

CITATION LIST

Patent Literature

Patent Literature 1: Japanese Patent Application Laid-Open No. 2011-152614 (e.g., FIG. 1(d))

SUMMARY OF INVENTION

Technical Problem

However, in the aforementioned related art, the crest of the beveled incomplete thread is formed on the curved surface around the axis as viewed in the axial direction of the thread forming tap (the crest of the incomplete thread has a substantially constant height around the axis). In this case, when the thread forming tap rotates with the incomplete thread in contact with the inner circumferential surface of a pilot hole, the crest of the incomplete thread is pressed against the inner circumferential surface of the pilot hole and creates friction, and therefore is more susceptible to chipping at its edge (although the diameter of the pilot hole is formed usually larger than the outer diameter of the incomplete thread, the crest of the incomplete thread sometimes makes contact with the pilot hole due to axis displacement of the thread forming tap). The chips of the incomplete thread caught between the inner circumferential surface of the pilot hole and the threads of the thread forming tap may easily cause machining defects in internal threads.

The present invention has an object to provide a thread forming tap capable of reducing machining defects in internal threads, and a manufacturing method for the thread forming tap.

Solution to Problem and Advantageous Effects of Invention

According to the thread forming tap cited in a first aspect and the manufacturing method for the thread forming tap cited in a sixth aspect, an incomplete thread portion includes lobes protruding in radial directions as viewed in the direction of the axis of the complete thread portion, and reliefs having diameters smaller than those of the lobes. When the thread forming tap rotates with the incomplete thread portion in contact with the inner circumferential surface of a pilot hole, the lobes of the incomplete thread portion can go into engagement with the inner circumferential surface of the pilot hole, and also the lobes can deform the inner circumferential surface of the pilot hole.

Thus, the incomplete thread portion can be prevented from being pressed against the inner circumferential surface of the pilot hole and creating friction, and thereby preventing chipping of the incomplete thread portion. Therefore, the thread forming tap has the effect of preventing the chips of the incomplete thread portion from being caught between the inner circumferential surface of the pilot hole and the threads on the thread forming tap, thereby reducing machining defects in internal threads.

According to the thread forming tap cited in a second aspect, in addition to the effect produced by the thread forming tap in the first aspect, the incomplete thread portion includes an inclined surface that is formed on the front end side of the chamfer portion, and is formed by beveling the incomplete thread. The inclined surface is inclined more toward the complete thread portion than in the direction perpendicular to the axis as viewed in the cross section cut by a plane including the axis, and therefore the crest of the incomplete thread portion can be located on the complete thread portion side.

This configuration can prevent the incomplete thread portion from making contact with the inner circumferential surface of the pilot hole before the thread in the chamfer portion is engaged with the inner circumferential surface of the pilot hole. Specifically, once the thread in the chamfer portion starts engaging with the pilot hole, the thread forming tap is hardly displaced off the axis, thereby preventing the incomplete thread portion from making contact with the inner circumferential surface of the pilot hole. Therefore, the thread forming tap has the effect of preventing the incomplete thread portion from chipping.

In addition, the inclined surface is formed to incline more toward the complete thread portion than in the direction perpendicular to the axis as viewed in the cross section cut along a plane including the axis, and therefore the crest of the incomplete thread portion is shaped so as to protrude in radial directions (i.e., an angled shape tapering in directions away from the axis). This allows the lobes of the incomplete thread portion to easily engage with the inner circumferential surface of the pilot hole, thereby enhancing deformation operation by the lobes. Thus, the incomplete thread portion can be prevented from being pressed against the inner circumferential surface of the pilot hole and creating friction, and therefore the thread forming tap has the effect of preventing the incomplete thread portion from chipping.

According to the thread forming tap cited in a third aspect, in addition to the effect produced by the thread forming tap in the second aspect, the inclined surface is formed such that a phantom line including the inclined surface does not overlap the thread in the chamfer portion or complete thread portion adjacent to the incomplete thread portion, as viewed in the cross section cut along a plane including the axis, and therefore this configuration can prevent the thread adjacent to the incomplete thread from making contact with a grinding wheel in the axial direction when the incomplete thread is being beveled with the grinding wheel to form the inclined surface (incomplete thread portion). Therefore, the thread forming tap has the effect of readily forming the inclined surface without complicated control over the grinding wheel.

According to the thread forming tap cited in a fourth aspect, in addition to the effect produced by the thread forming tap in the third aspect, the inclined surface is formed substantially in parallel with a flank of the thread in the chamfer portion or complete thread portion adjacent to the incomplete thread portion, the flank being located on the incomplete thread portion side, as viewed in the cross section cut along a plane including the axis, and therefore the lobes of the incomplete thread portion can enhance the deformation operation. Thus, the incomplete thread portion can be prevented from being pressed against the inner circumferential surface of the pilot hole and creating friction, and therefore the thread forming tap has the effect of preventing the incomplete thread portion from chipping.

According to the thread forming tap cited in a fifth aspect, in addition to the effect produced by the thread forming tap in the fourth aspect, the thread in the chamfer portion continuously formed with the incomplete thread portion includes a bevel portion having a bevel surface formed by beveling a flank of the thread in the chamfer portion on the front end side of the chamfer portion. Since the threads in the incomplete thread portion and bevel portion is formed so as to gradually increase in height along the helix of the thread from the front end of the chamfer portion, the gradual increase can provide continuity of height to the threads in the incomplete thread portion, bevel portion, and chamfer portion. Therefore, the thread forming tap has the effect of gradually deforming the inner circumferential surface of the pilot hole by using the threads in the incomplete thread portion, bevel portion, and chamfer portion when the thread forming tap rotates with the incomplete thread portion in contact with the inner circumferential surface of the pilot hole.

The manufacturing method for the thread forming tap cited in the sixth aspect includes a thread forming step that forms threads in the complete thread portion and chamfer portion, the threads having lobes protruding in radial directions in the axial direction of the complete thread portion, and reliefs having diameters smaller than those of the lobes, and a beveling step that bevels the incomplete thread formed in the thread forming step to form a bevel surface in the incomplete thread portion. In the beveling step, the lobes and reliefs can be readily formed in the incomplete thread portion because lobes and reliefs that are originally formed in the incomplete thread are preserved.

Specifically, the incomplete thread formed as part of the thread in the chamfer portion has originally-formed lobes and reliefs as with the threads in the complete thread portion and chamfer portion. Therefore, the manufacturing method for the thread forming tap has the effect of readily forming the lobes and reliefs in the incomplete thread portion by beveling the incomplete thread while preserving the lobes and reliefs that are originally formed in the incomplete thread.

DESCRIPTION OF EMBODIMENT

Figures 1A, 1B:
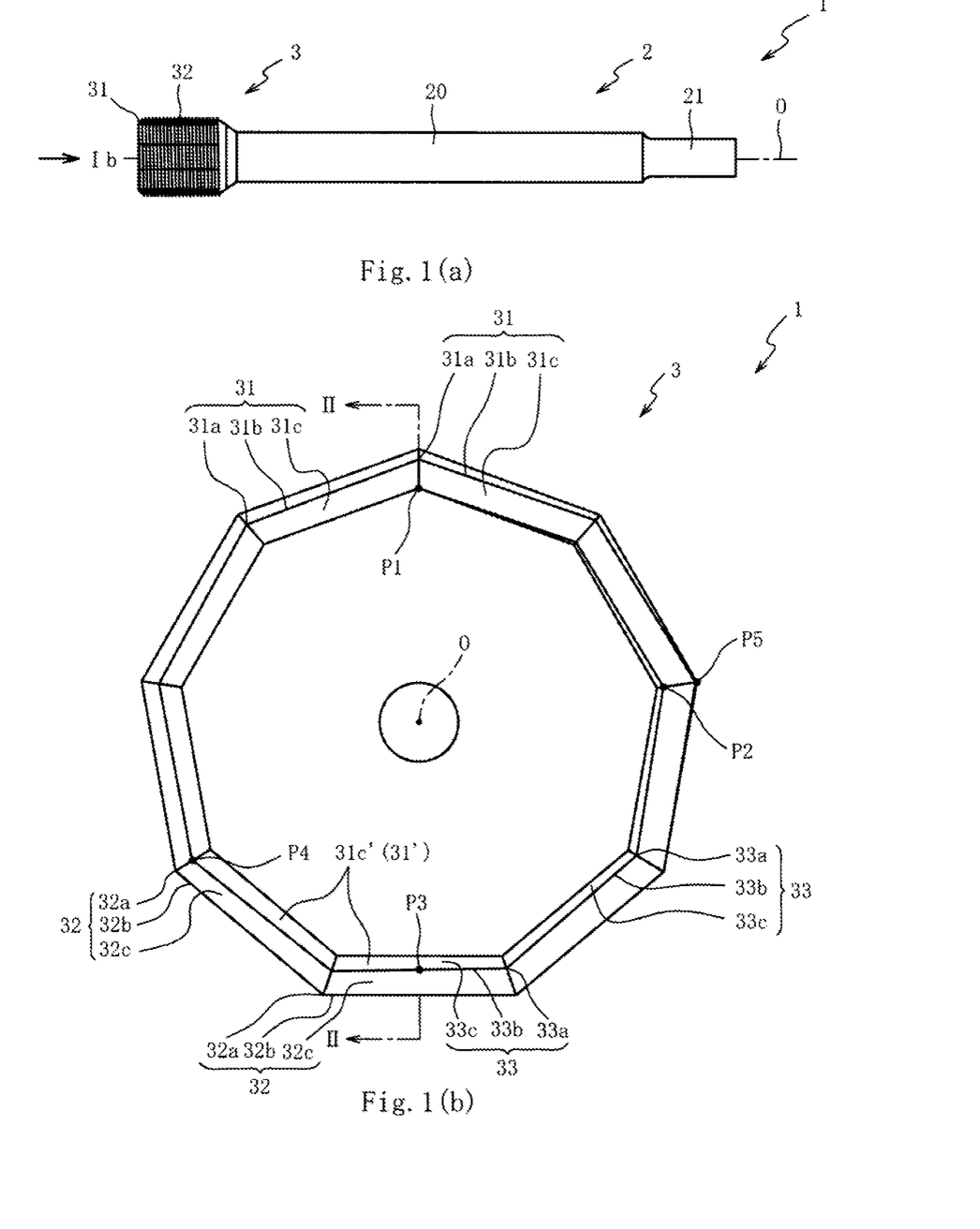
FIG. 1(a) is a side view of a thread forming tap according to the first embodiment of the present invention.
FIG. 1(b) is a front view of the thread forming tap as viewed in the direction of Arrow Ib in FIG. 1(a).

With reference to the accompanying drawings, preferred embodiments of the present invention will be described below. Firstly, the overall configuration of a thread forming tap 1 according to the first embodiment will be described by referring to FIG. 1(a). FIG. 1(a) is a side view of the thread forming tap 1 according to the first embodiment of the present invention. Note that, in FIG. 1(a), the thread forming tap 1 is partially omitted.

As shown in FIG. 1(a), the thread forming tap 1 includes a shank 2 and an external thread section 3 disposed on the front end side of the shank 2 (left side of FIG. 1(a)), and the thread forming tap 1 is used to form internal threads in a pilot hole (which is a predrilled hole in a workpiece to form internal threads) in a workpiece by means of torque transmitted from process machinery via a holder (not shown) holding the shank 2 and at a feed rate set in accordance with the lead of the threads. Note that the internal threads formation with the thread forming tap 1 may be made manually without limiting to being machined with a machining center, etc.

The shank 2 includes a main portion 20 in a cylindrical shape, and a shank square portion 21 being substantially square in cross section and formed on the rear end side of the main portion 20 (right side of FIG. 1(a)), and the shank 2 is made of high-speed tool steel. The material of the shank 2 is not limited to the high-speed tool steel, but may be made of cemented carbide.

The external thread section 3 includes a chamfer portion 31, which is formed on the front end side thereof (left side of FIG. 1(a)), and a complete thread portion 32, which is continuously formed with the chamfer portion 31 and positioned near the shank 2, and the external thread section 3 helically advances into the pilot hole formed in the workpiece to form internal threads (plastic deformation).

The chamfer portion 31 is provided to form internal threads by going into engagement with the surface part of the pilot hole in the workpiece and bringing about plastic deformation in the workpiece, while the complete thread portion 32 is provided to improve the finish of the internal thread surface and the guiding ability or self-guiding ability during formation of the internal threads in the workpiece. In the chamfer portion 31 and complete thread portion 32 formed are threads along a helix at a predetermined lead angle so as to have an approximately uniform height from the root.

Figure 2:
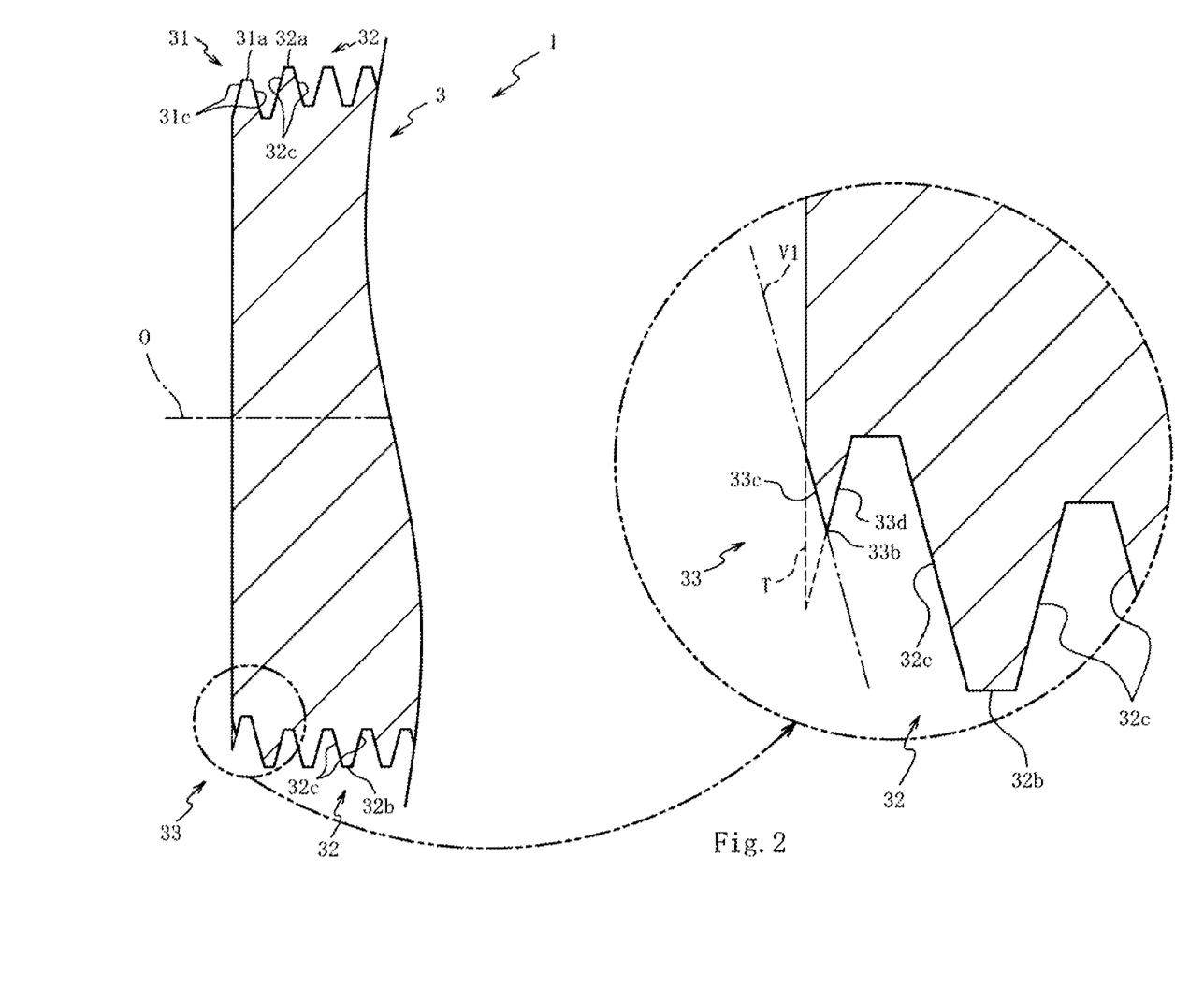
FIG. 2 is a partial cross-sectional view of the thread forming tap taken along line II-II in FIG. 1(b).

With reference to FIGS. 1(b) and 2, the configuration of the external thread section 3 will be described in detail. FIG. 1(b) is a front view of the thread forming tap 1 as viewed in the direction of Arrow Ib in FIG. 1(a). FIG. 2 is a partial cross-sectional view of the thread forming tap 1 taken along line II-II in FIG. 1(b). To provide clear understanding, the thread forming tap 1 is partially omitted in FIGS. 1(b) and 2. In addition, the angles of the threads in the chamfer portion 31 and the complete thread portion 32 are substantially 60 degrees; however, the threads in the chamfer portion 31 and the complete thread portion 32 shown in FIG. 2 are illustrated in a schematic form.

As shown in FIGS. 1(b) and 2, as viewed in the direction of the axis of the chamfer portion 31 and complete thread portion 32 (hereinafter, referred to as "axis O"), the threads in the chamfer portion 31 and complete thread portion 32 respectively have lobes 31a, 32a protruding in radial directions (which are directions away from the axis O), reliefs 31b, 32b having diameters smaller than those of the lobes 31a, 32a, and pairs of flanks 31c, 32c connecting the crests and roots of the threads.

The lobes 31a, 32a are provided to engage with the surface part of a pilot hole in a workpiece, and helically advance into the pilot hole to bring about plastic deformation in the workpiece to form internal threads, and the reliefs 31b, 32b are respectively formed between the lobes 31a and between the lobes 32a. Specifically, the threads in the external thread section 3 have the lobes 31a (32a) and the smaller-diameter reliefs 31b (32b) that are formed alternately along the advancing direction of the threads (that is, along the helix at a predetermined lead angle) and are formed continuously around the axis O. The outer shape of the external thread section 3 is a polygon (substantially a nonagon in this embodiment) as viewed in the direction of the axis O.

As viewed in the direction of the axis O, the lobes 32a (reliefs 32b) in the complete thread portion 32 are formed larger in diameter than the lobes 31a (reliefs 31b) in the chamfer portion 31 (the thread in the chamfer portion 31 is tapered as viewed in the direction perpendicular to the axis O).

The thread at the front end of the chamfer portion 31 (on the front side in FIG. 1(b), and on the left side in FIG. 2) is formed as an incomplete thread portion 33 along approximately a half circumference from its front end. This incomplete thread portion 33 is part of the thread in the chamfer portion 31; however, for the convenience of explanation, it is described with a different reference numeral from the chamfer portion 31 to provide better understanding.

When forming the thread in the chamfer portion 31, a part of the thread remains at the front end of the chamfer portion 31 as an incomplete thread (which is a thread having no flank on the front end side of the external thread section 3 in the direction of the axis O (on the left side in FIG. 2)). The incomplete thread is formed in a range from the position indicated by P1 in FIG. 1(b) to the position P3 along the helix so as to turn around the axis O about 180 degrees, and the incomplete thread portion 33 is formed by beveling the incomplete thread on the crest side (a part indicated by T in FIG. 2) (note that, in the description below, for example, the phrase "from the position indicated by P1 to the position P3 along the helix so as to turn around the axis O about 180 degrees" is abbreviated to "from P1 to P3". In addition, if P1 is used as a reference, P2 is positioned at about a 80-degree turn, P3 is at about a 180-degree turn, P4 is at about a 240-degree turn, and P5 is at about a 440-degree turn, from P1 along the helix).

Specifically, before the incomplete thread portion 33 is formed (before the beveling process), the thread in the chamfer portion 31 formed in the range from P1 to P3 has no flank on the front end side of the chamfer portion 31, but gradually develops a flank (which is a flank on the front end of the chamfer portion 31) from P3. In this embodiment, the thread in the chamfer portion 31 is beveled in the range from P1 to P4, but is not beveled in the range from P4 to P5.

In this case, the incomplete thread portion 33 has lobes 33a protruding in radial directions (directions away from the axis O) as viewed in the direction of the axis O, and reliefs 33b having diameters smaller than those of the lobes 33a.

When the thread forming tap 1 rotates with the incomplete thread portion 33 in contact with the inner circumferential surface of a pilot hole, the thread forming tap 1 can engage the lobes 33a with the inner circumferential surface of the pilot hole, and deform the inner circumferential surface of the pilot hole with the lobes 33a (the incomplete thread portion 33 can have deformation ability equivalent to that of the thread in the chamfer portion 31).

In comparison with the case where the crest of the incomplete thread is beveled along the circumferential direction about the axis O (the beveled incomplete thread portion has a substantially uniform crest height around the axis O, and therefore cannot deform the inner circumferential surface of the pilot hole), the incomplete thread portion 33 can be prevented from being pressed against the inner circumferential surface of the pilot hole and creating friction, thereby preventing chipping of the incomplete thread portion 33. In this way, the chips of the incomplete thread portion 33 can be prevented from being caught between the inner circumferential surface of the pilot hole and the thread in the chamfer portion (complete thread portion 32) during formation of the internal threads, thereby reducing machining defects in internal threads.

The incomplete thread portion 33 includes inclined surfaces 33c on the front end side of the chamfer portion 31 (on the left side in FIG. 2). This inclined surfaces 33c are planes inclined more toward the complete thread portion 32 (toward the rear end side of the external thread section 3, and on the right side in FIG. 2) than in the direction perpendicular to the axis O as viewed in the cross section cut along a plane including the axis O (hereinafter referred to as "in a cross-sectional view").

Specifically, the inclined surfaces 33c are formed by beveling the incomplete thread so as to have a profile inclined more toward the complete thread portion 32 than in the direction perpendicular to the axis O in the cross-sectional view (a profile inclined in the direction indicated by a phantom line V1, or a profile in which an end of the inclined surface 33c, which is closer to the axis O, is positioned farther to the complete thread portion 32 than the other end thereof). The incomplete thread portion 33 beveled in this way can have its crest at a position closer to the complete thread portion 32 (on the rear end side of the chamfer portion 31 (on the right side in FIG. 2)), and therefore, the crest of the incomplete thread portion 33 can be prevented from making contact with the inner circumferential surface of the pilot hole before the thread in the chamfer portion 31 (thread in a range from P4 to P5) is engaged with the inner circumferential surface of the pilot hole while the front end of the chamfer portion 31 is advancing into the pilot hole.

In this case, once the thread (lobes 31a) in the chamfer portion 31 starts engaging with the pilot hole, the thread forming tap 1 is hardly displaced off the axis, thereby preventing the incomplete thread portion 33 from making contact with the inner circumferential surface of the pilot hole. This can prevent the incomplete thread portion 33 from chipping.

In addition, the inclined surfaces 33c are formed to incline more toward the complete thread portion 32 than in the direction perpendicular to the axis O (the incomplete thread is beveled along the phantom line V1) in a cross-sectional view, and therefore the crest of the incomplete thread portion 33 is shaped so as to protrude in radial directions (i.e., an angled shape tapering in directions away from the axis O). This allows the lobes 33a to easily engage with the inner circumferential surface of the pilot hole, thereby enhancing deformation operation by the lobes 33a. Thus, the incomplete thread portion 33 can be prevented from being pressed against the inner circumferential surface of the pilot hole and creating friction, and thereby preventing chipping of the incomplete thread portion 33.

Furthermore, in a cross-sectional view, the inclined surfaces 33c are formed substantially in parallel with flanks 31c of the thread in the chamfer portion 31 adjacent to the incomplete thread portion 33 or flanks 32c of the thread in the complete thread portion 32 on the front end side of the chamfer portion (closer to the incomplete thread portion 33, or on the left side in FIG. 2) (although the thread in the complete thread portion 32 is adjacent to the incomplete thread portion 33 in FIG. 2, the incomplete thread portion 33 in the range from P1 to P2 in FIG. 1(b) is adjacent to the thread in the chamfer portion 31, while the incomplete thread portion 33 in the range from P2 to P3 is adjacent to the thread in the complete thread portion 32 in a cross-sectional view).

In this case, since the flanks 33d of the incomplete thread portion 33 are parts originally formed in the incomplete thread (extension parts of the thread in the chamfer portion 31), the flanks 33d are formed in parallel with the flanks 31c, 32c on the rear end side of the chamfer portion 31 and complete thread portion 32 (on the right side in FIG. 2).

In other words, since the angles which the inclined surfaces 33c form with the flanks 33d are substantially the same as the angles of the threads in the chamfer portion 31 and complete thread portion 32 (angles between the pair of flanks 31c (flanks 32c). It is about 30 degrees in this embodiment) in a cross-sectional view, the lobes 33a can enhance the deformation operation. Thus, the incomplete thread portion 33 can be prevented from being pressed against the inner circumferential surface of the pilot hole and creating friction, and thereby preventing chipping of the incomplete thread portion 33.

In this description, the phrases "substantially in parallel" and "substantially the same" are mainly used to indicate tolerances in beveling of the incomplete thread portion 33 (during formation of the inclined surface 33c), and the phrases define that the inclined surfaces 33c are formed at a flank angle in a range of the half angle of the thread in the chamfer portion 31 (complete thread portion 32) plus or minus 5 degrees.

As described above, the range from P1 to P4 is beveled in this embodiment. In other words, the thread in the chamfer portion 31 in the range from P3 to P4 is beveled to be a bevel portion 31'. This bevel portion 31' has bevel surfaces 31c' that are beveled along a plane substantially in parallel with a flank 31c (flank 31c on the front end side of the chamfer portion 31) originally formed on the thread in the chamfer portion 31.

Before the bevel portion 31' is formed, the thread in the chamfer portion 31 in the range from P3 to P4 has originally-formed flanks 31c (flanks 31c on the front end side of the chamfer portion 31), but the thread in the vicinity of P3 is formed in the shape similar to the incomplete thread (the length of the flank 31c is relatively short in the cross-sectional view). Therefore, beveling only the incomplete thread in the range from P1 to P3 causes a height difference in the thread at P3.

On the contrary, the thread forming tap 1 according to this embodiment having the bevel portion 31' (namely, the thread in the range from P3 to P4 is also beveled) can hardly have such a thread height difference at P3.

The thread in the incomplete thread portion 33 and bevel portion 31' is formed such that the height of the thread gradually increases along the helix of the thread from the front end of the chamfer portion 31 (the incomplete thread portion 33 and bevel portion 31' are formed such that the height of the thread in the range from P1 to P4 gradually increases), and therefore when the thread forming tap 1 rotates with the incomplete thread portion 33 in contact with the inner circumferential surface of the pilot hole, the thread in the incomplete thread portion 33, bevel portion 31', and chamfer portion 31 can gradually deform the inner circumferential surface of the pilot hole.

Although, as described above, the incomplete thread portion 33 is part of the thread in the chamfer portion 31, the "thread in the chamfer portion" cited in the third and fourth aspects, for example, is to define the thread in the chamfer portion 31 except the thread in the incomplete thread portion 33, and corresponds to the thread in the range from P3 to P5.

Next, a method for manufacturing the thread forming tap 1 will be described. In manufacture of the thread forming tap 1, a thread forming process and a beveling process are performed in succession. The thread forming process involves formation of threads in the chamfer portion 31 and complete thread portion 32, respectively, having lobes 31a, 32a and reliefs 31b, 32b. In this process, as described above, an incomplete thread is formed in the thread on the front end side of the chamfer portion 31, and this incomplete thread formed as part of the thread in the chamfer portion 31 has lobes and reliefs from the beginning.

In the beveling process, the incomplete thread is beveled at an angle such that the crests of neighboring lobes of the incomplete thread are inclined more toward the complete thread portion 32 than in the direction perpendicular to the axis O (in this embodiment, at an angle to be parallel with the flanks 31c, 32c on the front end side of the chamfer portion 31) in a cross-sectional view, and also are located to be substantially parallel with the reliefs of the incomplete thread (in the direction indicated by phantom line V1 in FIG. 2), and thereby preserving the lobes and reliefs originally formed in the incomplete thread. In short, the lobes 33a, reliefs 33b, and inclined surfaces 33c in the incomplete thread portion 33 can be readily formed by utilizing the lobes and reliefs originally formed in the incomplete thread.

This beveling process forms the lobes 31a, 33a, reliefs 31b, 33b, flanks 31c, and inclined surfaces 33c on the entire thread at the front end of the chamfer portion 31 (the entire thread including the incomplete thread portion 33). Therefore, the entire thread at the front end of the chamfer portion 31 (the entire thread including the incomplete thread portion 33) can deform the inner circumferential surface of the pilot hole.

When the thread forming tap 1 rotates with the incomplete thread portion 33 in contact with the inner circumferential surface of the pilot hole, the incomplete thread portion 33 can be prevented from being pressed against the inner circumferential surface of the pilot hole and creating friction, thereby preventing chipping of the incomplete thread portion 33. In this way, the chips of the incomplete thread portion 33 can be prevented from being caught between the inner circumferential surface of the pilot hole and the thread in the chamfer portion 31 (complete thread portion 32) during formation of the internal threads, thereby reducing machining defects in internal threads.

Next, with reference to FIGS. 3(a) and 3(b), the second embodiment will be described. In the first embodiment, the angles in which the inclined surfaces 33c form with the flanks 33d in a cross-sectional view are set to be substantially the same as the angles of the threads in the chamfer portion 31 and the complete thread portion 32; however, in the second embodiment, the angles in which inclined surfaces 233c form with flanks 233d are set to be greater than the angles of the threads in a chamfer portion 231 and a complete thread portion 232. It is noted that like components are denoted by like numerals as of the first embodiment and will not be further explained.

Figures 3A, 3B:
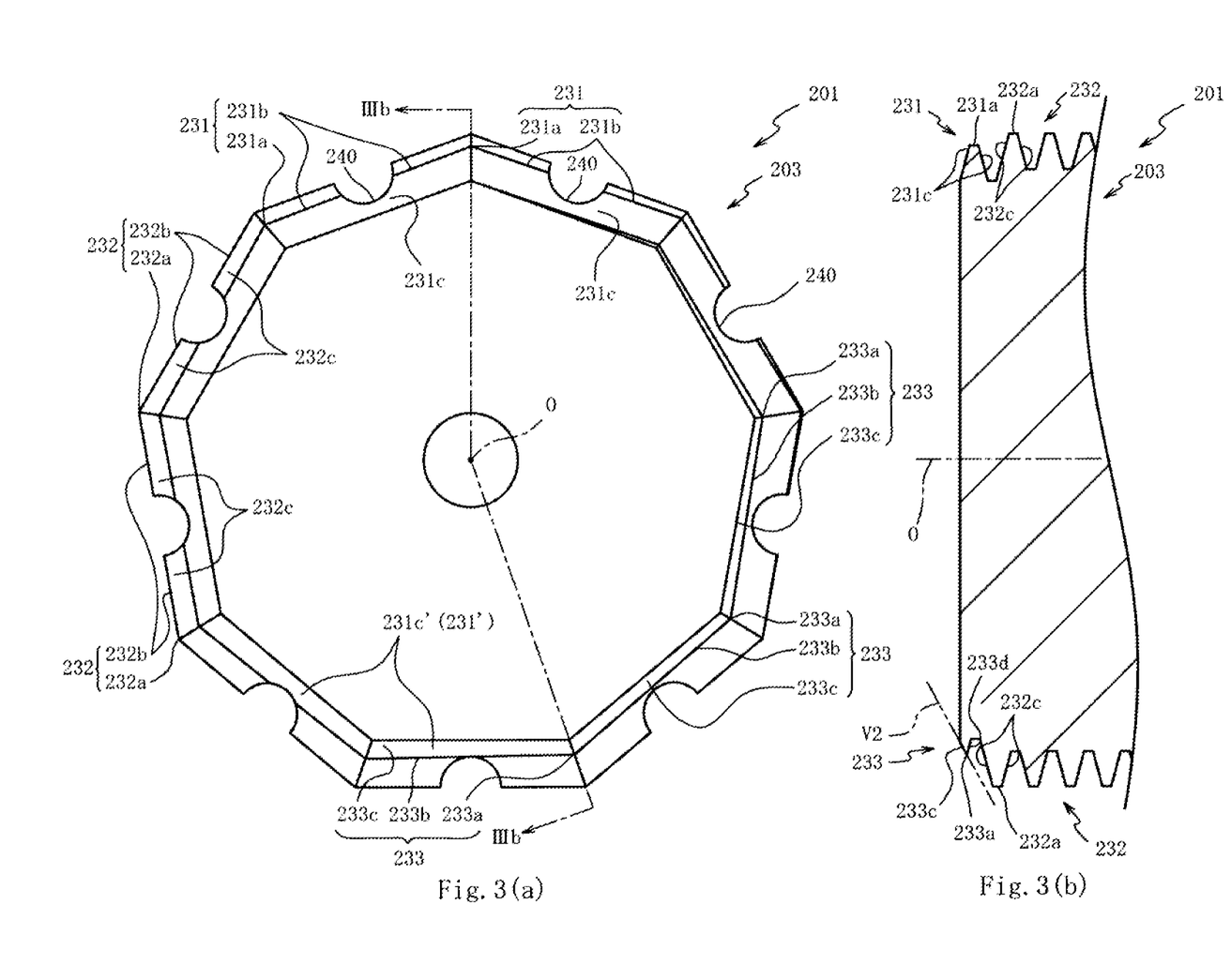
FIG. 3(a) is a side view of a thread forming tap according to the second embodiment.
FIG. 3(b) is a partial cross-sectional view of the thread forming tap taken along line IIIb-IIIb in FIG. 3(a).

FIG. 3(a) is a front view of a thread forming tap 201 according to the second embodiment, and FIG. 3(b) is a partial cross-sectional view of the thread forming tap 201 taken along line IIIb-IIIb in FIG. 3(a). To provide clear understanding, the thread forming tap 201 is partially omitted in FIGS. 3(a) and 3(b). In addition, the angles of the threads in the chamfer portion 231 and complete thread portion 232 are substantially 60 degrees; however, the threads in the chamfer portion 231 and complete thread portion 232 shown in FIGS. 3(a) and 3(b) are illustrated in a schematic form.

As shown in FIGS. 3(a) and 3(b), the thread forming tap 201 in the second embodiment is configured in the same manner as that in the first embodiment except for the following configurations: lubrication grooves 240 are formed in the outer circumferential surface of an external thread portion 203 (reliefs 231b, 232b) along the axis O; and the angles in which inclined surfaces 233c form with flanks 233d in a cross-sectional view are set to be greater than the angles of the threads in the chamfer portion 231 and complete thread portion 232.

The inclined surfaces 233c are preferably formed so as to at least incline more toward the complete thread portion 232 than in the direction perpendicular to the axis O (on the rear end side of the chamfer portion 231, or on the right side in FIG. 3(b)) in a cross-sectional view (the inclined surface 233c is formed such that the crest of an incomplete thread portion 233 is positioned closer to the rear end side of the chamfer portion 231 (on the right side in FIG. 3(b)) than the crest of the incomplete thread before being beveled was positioned, in a cross-sectional view).

In this case, it is preferable, as described in this embodiment, to form the inclined surface 233c such that a phantom line V2 including the inclined surface 233c does not overlap (overlie) the thread in the chamfer portion 231 or complete thread portion 232 adjacent to the incomplete thread portion 233 (the incomplete thread portion 233 in FIG. 3(b) is adjacent to the thread in the complete thread portion 232; however, as with the case of the first embodiment, the incomplete thread portion 233 is partially adjacent to the thread in the chamfer portion 231 in a cross-sectional view).

When the incomplete thread portion 233 is beveled (to form the inclined surfaces 233c) by using a grinding wheel, the above-described configuration can prevent the threads in the chamfer portion 231 and complete thread portion 232 adjacent to the incomplete thread portion 233 from making contact with the grinding wheel. Thus, the inclined surfaces 233c can be readily formed without complicated control over the grinding wheel.

Although the present invention has been described with reference to the foregoing embodiments, it can be readily inferred that the invention is not limited to the embodiments and various modifications can be made without departing from the scope of the invention. For instance, the angles of the threads in the chamfer portions 31, 231 and the complete thread portions 32, 232 are just examples, and can be set in a appropriate manner (a general thread angle is in a range from 25 degrees to 65 degrees).

Both of the above-described embodiments form the incomplete thread portions 33, 233 while preserving the threads in the chamfer portions 31, 231 and complete thread portions 32, 232 adjacent to the incomplete thread portion 33, 233 (the incomplete thread is beveled to form the inclined surfaces 33c, 233c); however the present invention is not always limited to the embodiments, and, for example, the crests of the threads in the chamfer portions 31, 231 or complete thread portions 32, 232 adjacent to the incomplete thread portions 33, 233 may be configured to be beveled in a cross-sectional view (phantom lines V1, V2 overlap the chamfer portions 31, 231 or complete thread portions 32, 232, respectively). In short, the incomplete thread portions 33, 233 (inclined surfaces 33c, 233c) can be formed by beveling a pre-beveled incomplete thread while preserving the originally-formed lobes and reliefs.

Although, in the above-described embodiments, the incomplete thread portions 33, 233 are formed by beveling an incomplete thread, the present invention is not limited thereto, and, for example, the incomplete thread portions can be formed without beveling the incomplete thread. Because the incomplete thread (in the conditions before the incomplete thread portions 33, 233 are formed) has lobes and reliefs from the beginning, the present invention can be implemented without beveling the crest of the incomplete thread.

Although, in the above-described embodiments, the external thread section 3 (chamfer portions 31, 231 and complete thread portions 32, 232) is shaped in a substantially nonagon as viewed in the direction of the axis O, the present invention is not always limited thereto, and the external thread section 3 can be shaped in polygons other than the nonagon. Typical examples include a rectangular, a pentagon, a hexagon, and an octagon.

The invention claimed is:

1. A thread forming tap comprising a complete thread portion including threads, and a chamfer portion continuously formed with the complete thread portion and including a tapered thread, a part of the thread at a front end of the chamfer portion being configured as an incomplete thread portion including an incomplete thread, and the thread forming tap forming internal threads by means of plastic deformation, wherein the incomplete thread portion has lobes protruding in radial directions as viewed in a direction of the axis of the complete thread portion, reliefs having diameters smaller than those of the lobes, and an inclined bevel surface formed on a front end side of the chamfer portion by beveling the incomplete thread, the tapered thread in the chamfer portion continuously formed with the incomplete thread portion includes a bevel portion having the inclined bevel surface formed by beveling a flank of the tapered thread in the chamfer portion, the flank being located on the front end side of the chamfer portion, the thread in the incomplete thread portion and the bevel portion is formed such that the height of the thread gradually increases along a helix of the thread from the front end of the chamfer portion, a part of the thread closest to the front end of the chamfer portion includes a plurality of the inclined bevel surfaces formed by beveling the incomplete thread, each of the plurality of the inclined bevel surfaces is formed as a planar surface that is inclined so as to be positioned closer to the complete thread portion toward a crest of the thread, and the plurality of the inclined bevel surfaces are sequentially arranged around the axis, and a tip of a respective one of the lobes is located at a boundary between neighboring ones of the inclined bevel surfaces arranged around the axis.

2. The thread forming tap according to claim 1, wherein the inclined surface is inclined more toward the complete thread portion than in the direction perpendicular to the axis as viewed in a cross section cut along a plane including the axis.

3. The thread forming tap according to claim 1, wherein the inclined bevel surface is formed substantially in parallel with a flank of the thread in the chamfer portion or the complete thread portion adjacent to the incomplete thread portion, the flank being located on the incomplete thread portion side of the thread, as viewed in the cross section cut along a plane including the axis.

4. A method for manufacturing a thread forming tap that includes a complete thread portion having threads, and a chamfer portion continuously formed with the complete thread portion and having a tapered thread, a part of the thread at a front end of the chamfer portion being configured as an incomplete thread portion including an incomplete thread, and the thread forming tap forming internal threads by means of plastic deformation, the method comprising the steps of:

forming threads including lobes protruding in radial directions as viewed in the direction of the axis of the complete thread portion, and reliefs having diameters smaller than those of the lobes, in the complete thread portion and the chamfer portion; and beveling the incomplete thread formed in the thread forming step to form a bevel surface in the incomplete thread portion, wherein in the beveling step, the lobes and reliefs are formed in the incomplete thread portion by beveling the incomplete thread while preserving lobes and reliefs that are originally formed in the incomplete thread, in the beveling step, the incomplete thread is beveled to form a plurality of inclined bevel surfaces at a part of the thread closest to the front end of the chamfer portion, each of the plurality of the inclined bevel surfaces being a planar surface that is inclined so as to be positioned closer to the complete thread portion toward a crest of the thread, and in the beveling step, the incomplete thread is beveled such that the plurality of the inclined bevel surfaces are sequentially arranged around the axis, and a tip of a respective one of the lobes is located at a boundary between neighboring ones of the inclined bevel surfaces arranged around the axis.

* * * * *